US005187376A

United States Patent [19]

Hashimoto et al.

[11] Patent Number: 5,187,376

[45] Date of Patent: Feb. 16, 1993

[54] PRINT MONITORING APPARATUS WITH DATA PROCESSING

[75] Inventors: Yutaka Hashimoto, Ayase; Mitsuhiko Iida, Yokohama; Makoto Hayashi, Zama; Sizunori Kaneko, Odawara; Masahiro Nakazato, Numazu, all of Japan

[73] Assignee: Toshiba Kikai Kabushiki Kaisha, Tokyo, Japan

[21] Appl. No.: 811,010

[22] Filed: Dec. 20, 1991

[30] Foreign Application Priority Data

Dec. 20, 1990 [JP] Japan ..................... 2-412429
Dec. 25, 1990 [JP] Japan ..................... 2-414363

[51] Int. Cl.[5] ..................... G01N 21/88

[52] U.S. Cl. ..................... 250/562; 250/572

[58] Field of Search ..................... 250/562, 563, 571, 572, 250/233 B; 356/237, 238, 430, 431

[56] References Cited

U.S. PATENT DOCUMENTS 4,820,932 4/1989 Miller ..................... 250/562
4,948,956 8/1990 Fukuchi ..................... 250/223 B

*Primary Examiner*—David C. Nelms
*Attorney, Agent, or Firm*—Stevens, Davis, Miller & Mosher

[57] ABSTRACT

A print monitoring apparatus for monitoring a print transported out of a printing unit comprises a defect position discrimination unit for discriminating a position of a defect on a print web of the print fed from the printing unit, a defect memory unit for storing defect position information given from the defect position discrimination unit and record information containing defect occurrence time, a number of successive occurrence pages, a roll paper name and a number of used pages, and a display unit for displaying the information stored in the defect memory unit. In another aspect, a print monitoring apparatus for monitoring a print transported out of a printing unit comprises a print defect detection unit for detecting defect on a print web of the print fed from the printing unit, the defect detection unit including a monitoring sensor for dividing a print surface of the print web into a plurality of pixels and converting information of pixels into electric signals representing density information of the respective pixels, a central processing unit for processing information data regarding the density information of the respective pixels from the print defect detection unit, and a defect content discrimination unit for discriminating defect content in accordance with information data from the central processing unit and preliminarily set reference for the discrimination.

10 Claims, 12 Drawing Sheets

PRINT MONITORING APPARATUS WITH DATA PROCESSING

BACKGROUND OF THE INVENTION

The present invention relates to an apparatus for monitoring defects in prints printed, i.e. printed material, by, for example, an rotary offset press.

Conventional apparatus for monitoring defects in prints are disclosed, for example, in Japanese Patent Laid-Open Publication Nos. 60-58535 and 56-98638. In such apparatus, a contamination or the like formed on a print surface is observed or monitored with a detection sensor which extends perpendicularly to the direction in which the print surface is moved. As the print surface is moved, it is scanned with the detection sensor in synchronization with its movement to observe or monitor the whole area of the print surface with respect to linear sections thereof.

If a defect is discriminated, the position at which the defect has occurred, the cause of the defect and other kinds of information are displayed on a screen of a display unit such as a CRT, and a marking circuit is operated according to the content of the defect to mark the corresponding print portion of a print web by means of spraying (disclosed in, for example, Japanese Patent Laid-Open Publication No. 60-155465).

These conventional apparatus detect only the position of contaminations and cannot discriminate the contents of contaminations. Defects in the print surface are not limited to those occurring at arbitrary times and at arbitrary positions, e.g., a spatter of ink, and drops of water or oil. There are other defects such as density unevenness occurring in the direction of the flow of the print web by a cause relating to the adjustments of an ink control unit of the printing machine, and a streak-like defect occurring in the direction of the flow by a blanket failure or the like. Density unevenness of a streak-like defect is continuous unlike the transitory defects, i.e., a spatter of ink and drops of water or oil and must be removed by adjusting the printing machine.

The conventional print monitoring apparatuses therefore entail the following problems.

First, since only the defect position is indicated, it is difficult to discriminate whether the defects are single-occurrence phenomena or continuous phenomena.

Second, in the case of making a print, it is necessary to exatract a defective sample each time a defect occurs. It is therefore difficult to ascertain the cause, so that the finding of the print hindrance cause is retarded, resulting in an increase in printing cost.

SUMMARY OF THE INVENTION

The present invention has been achieved to solve the above-described problems, and an object of the present invention is to provide a print monitoring apparatus capable of discriminating the contents of print defects such as contaminations.

Another object of the present invention is to provide a print monitoring apparatus capable of storing records of print defects to speedily perform operations for controlling and maintaining the printing machine.

To achieve these objects, according to the present invention, in one aspect, there is provided a print monitoring apparatus for monitoring a print transported out of a printing unit, comprising a defect position discrimination unit for discriminating a position of a defect on a print web of the print fed from the printing unit, a defect record memory unit for storing defect position information given from the defect position discrimination unit and record information containing defect occurrence time, a number of successive occurrence pages, a roll paper name and a number of used pages, and a display unit for displaying the information stored in the defect record memory unit.

According to this aspect of the present invention, when defects occur, the positions of the defects are discriminated by the defect position discrimination unit, and defect position information thereby obtained is stored by the defect record memory unit along with record information such as the defect occurrence time, the number of successive occurrence pages, a roll paper name and the number of used pages and is displayed by the record display unit. By monitoring this defect record, the operator can be informed of whether the defects have occurred on one page alone, whether the defects are continuous, whether the defects are concentrated on a particular roll sheet, whether the defects have occurred at page intervals. The operator can discriminate the contents of defects based on this information.

In another aspect, there is provided a print monitoring apparatus for monitoring a print transported out of a printing unit, comprising a print defect detection unit for detecting defect on a print web of the print fed from the printing unit, the defect detection unit including a monitoring sensor for dividing a print surface of the print web into a plurality of pixels and converting information of pixels into electric signals representing density information of the respective pixels, a central processing unit for processing information data regarding the density information of the respective pixels from the print defect detection unit, and a defect content discrimination unit for discriminating defect content in accordance with information data from the central processing unit and preliminarily set reference for the discrimination.

In a preferred embodiment of this aspect, the central processing unit includes a calculating means for calculating a percent defective of a non-image portion of the print web and a percent defective of an image portion thereof based on the reflection density information with respect to the pixels of the print web and the defect content discrimination unit includes a determination means for determining the content of the defect by comparing the percent defective of the non-image portion obtained by the central processing unit with the percent defective discrimination value preliminarily set.

According to this other aspect of the present invention, a percent defective of a non-image portion in each unit area of the print surface to be observed and a percent defective of an image portion in this are calculated by the central processing unit based on reflection density information with respect to pixels of the print surface. The percent defectives of the non-image and image portions obtained by the central processing unit are compared with a percent defective discrimination value previously set in the defective content discrimination unit to discriminate the content of the defect in the print surface.

It is thereby possible to discriminate defect contents as well occurrence of print defects.

BRIEF DESCRIPTION OF THE DRAWINGS

For a better understanding of the present invention and to show how the same is carried out, reference is first made, by way of preferred embodiments, to the accompanying drawings, in which.

DESCRIPTION OF THE PREFERRED EMBODIMENTS

Figure 1:
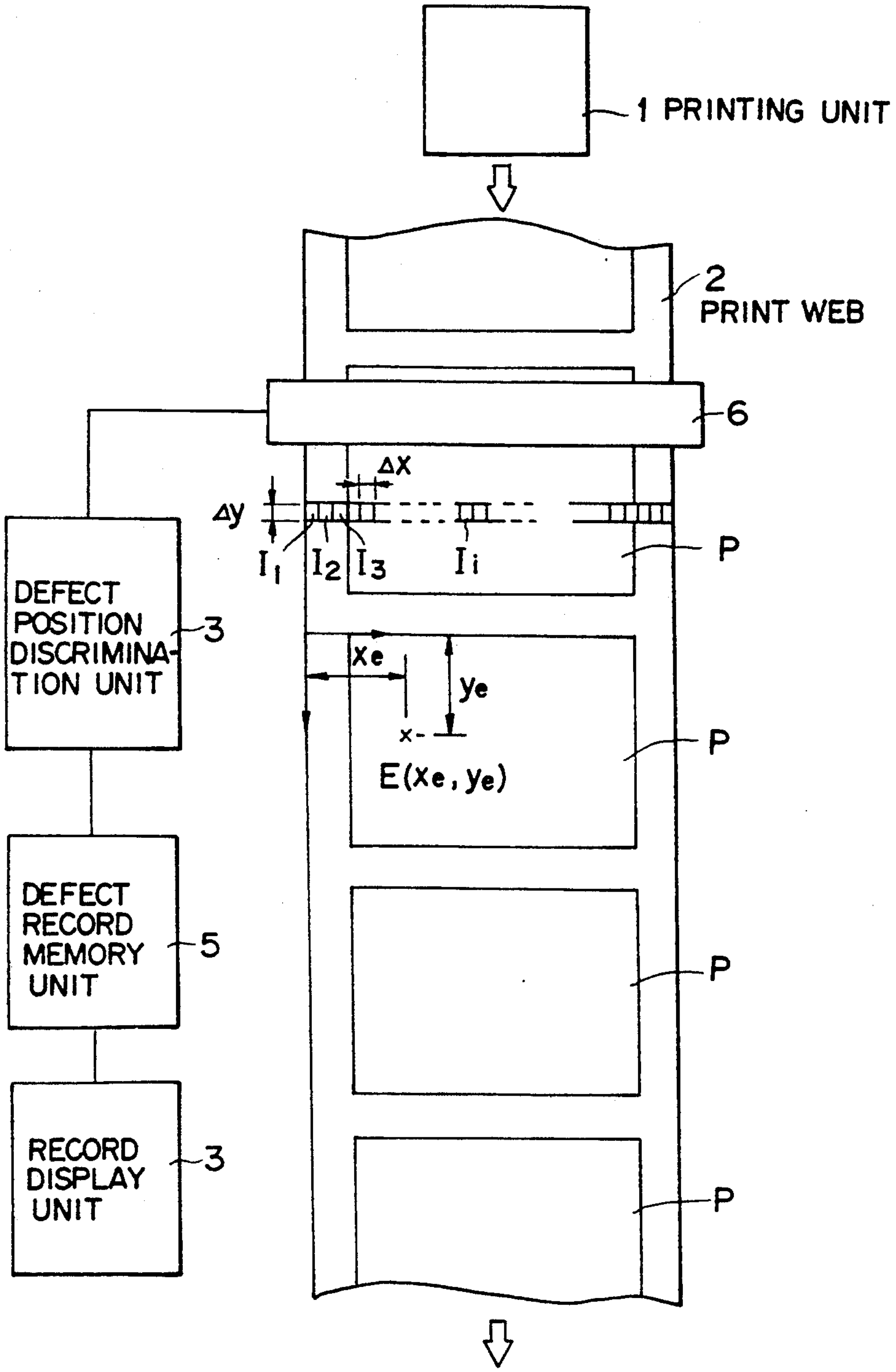
FIG. 1 is a block diagram of a basic construction of a print monitoring apparatus in accordance with one embodiment of the present invention.

FIG. 1 is a schematic diagram of the construction of a print monitoring apparatus in accordance with one embodiment of the present invention. This print monitoring apparatus is comprised of a defect position discrimination unit 3 for discriminating the position of a defect on a print web 2 transported out of a printing unit 1, a defect memory unit 5 for storing defect position information E as well as record information such as the defect occurrence time, the number of successive occurrence pages, a roll paper name and the number of used pages, and a printer 30 provided as a display unit for displaying the stored information.

Figure 3:
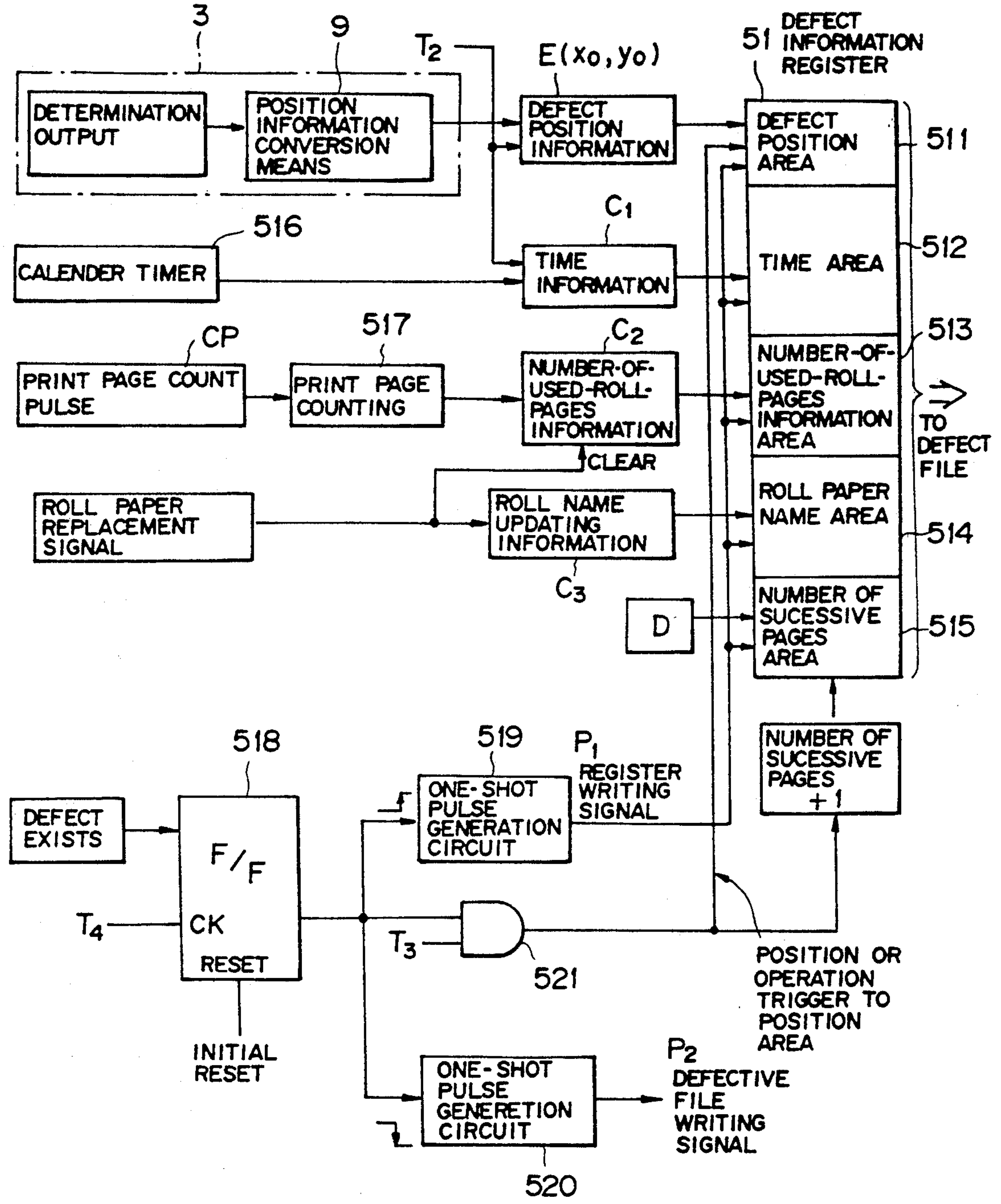
FIG. 3 is a control block diagram of a system for processing signals to a defect information register.
Figure 4:
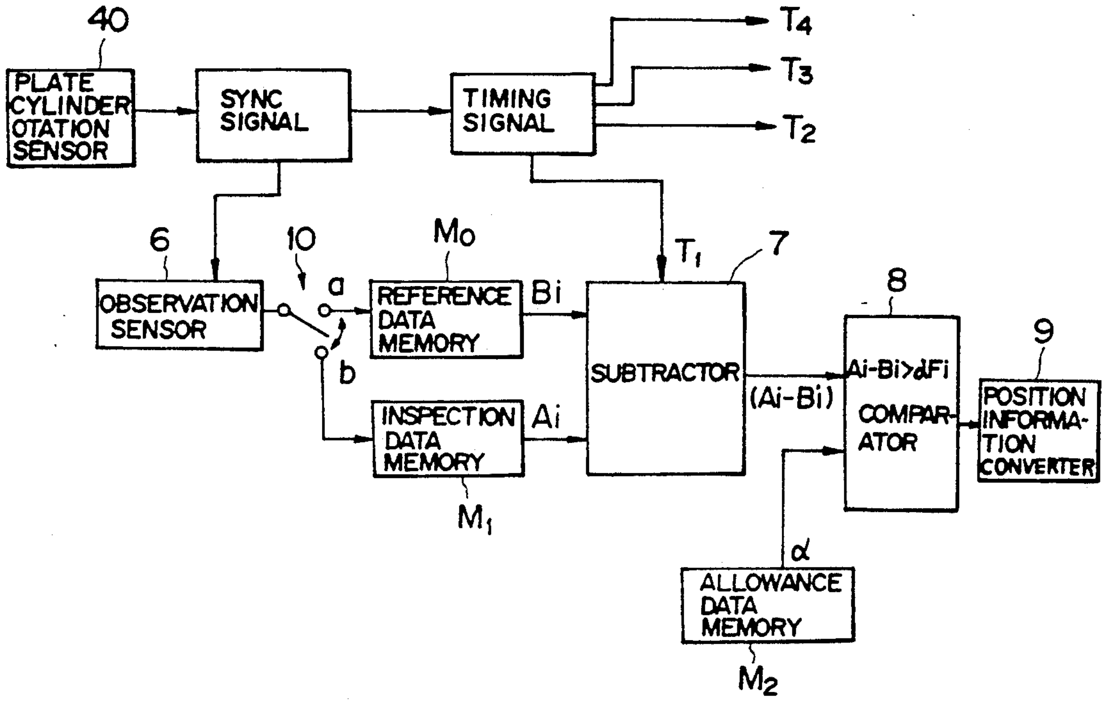
FIG. 4 is a block diagram of details of the construction of the defect position discrimination means shown in FIG. 1.

As shown in FIGS. 3 and 4, the defect position discrimination unit 3 is comprised of a monitoring sensor 6 which converts optical information on a plurality of pixels divided on the print web 2 into electrical signals, a reference data memory M0 for storing reference data Bi preliminarily prepared for each print, an inspection data memory M1 for storing actual inspection data Ai, a subtractor 7 for subtraction between reference data Bi and inspection data Ai respectively stored in the reference data memory M0 and the inspection data memory M1, and allowance data $\alpha$, and a position information conversioin unit 9 for converting defect information discriminated by the comparator 8 into information on the position on the print web 2.

A changeover switch 10 is provided between the monitoring sensor 6, the reference data memory M0 and the inspection data memory M1. The changeover switch 10 is operated to selectively transmit detection data obtained from the monitoring sensor 6 to the reference data memory M0 or the inspection data memory M1. In this embodiment, if it is determined that a print obtained by trial printing performed initially in a printing process is free from defects and normal, the changeover switch 10 is operated to establish a connection through a terminal a, so that the information on this normal print is stored as reference data Bi in the reference data memory M0.

To use measurement data which is to be inspected after the preparation of reference data Bi, the changeover switch 10 is operated to establish a connection through a terminal b, so that the measurement data is stored in the inspection data memory M1. Subtraction between inspection data Ai and reference data Bi is executed in the subtractor 7 with respect to each pixel by a synchronous signal generated when inspection data Ai corresponding to one printing page on the printing web 2 is prepared in the inspection data memory M1, and the result of this operation is output as inspection output data (Ai−Bi).

This inspection output data (Ai−Bi) is compared with allowance data $\alpha$ with respect to each pixel in the comparator 8. A pixel Ii monitored or observed with a result that inspection output data (Ai−Bi)> allowance data $\alpha$ is thereby determined as a defective pixel to output a determination result Fi.

The monitoring sensor 6 is a line sensor extending in a direction perpendicular to the flow of the print web 2 and scans a print surface thereof with respect to linear detection areas having a predetermined width to observe contaminations. Detection-unit pixel Ii is defined as one of a plurality of sections of each linear detection area, as shown in FIG. 1. Light receiving elements of a light receiving device such as a CCD are disposed in correspondence with pixels Ii. If the direction of the flow of the print web 2 is y-axis and a direction perpendicular to the y-axis, is x-axis, the position of one of pixels Ii on one print surface P formed by a plate cylinder can be determined in an xy-coordinate matrix.

Determination output Fi is converted into information E (xe, ye) on the defect position on print web 2 by the position information conversion unit 9.

Figure 2:
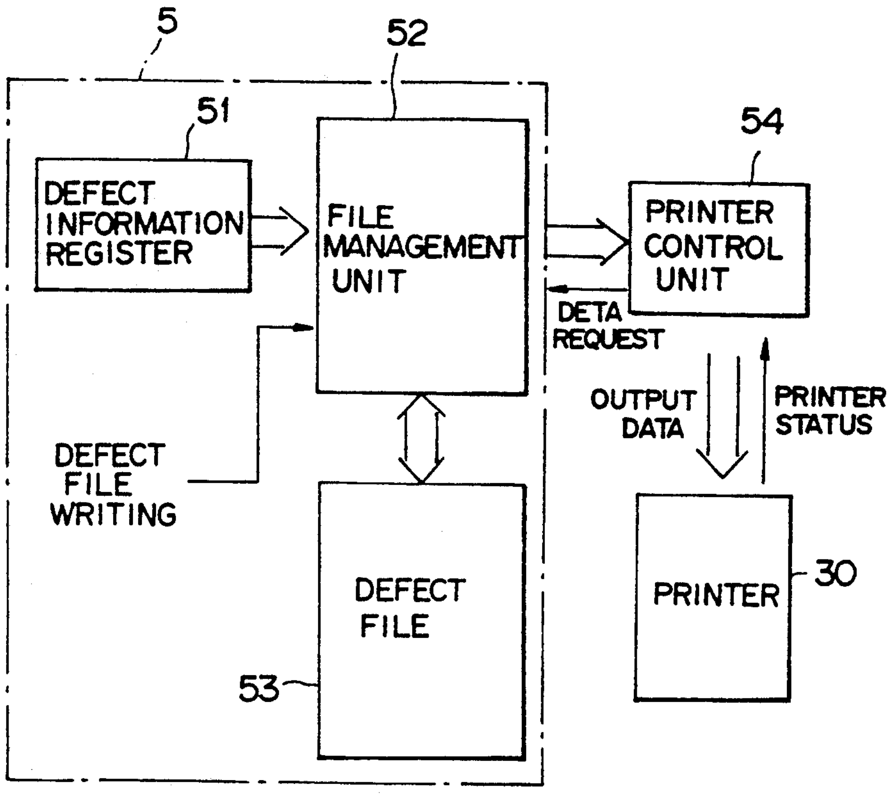
FIG. 2 is a control block diagram showing details of the construction shown in FIG. 1.

The defect memory unit 5 is comprised of a defect information register 51, a file management unit 52 and a defect file 53, as shown in FIG. 2. The defect information register 51 has, as shown in FIG. 3, a defect position area 511, a time area 512, a number-of-used-roll-pages area 513, a roll paper name area 514 and a number-of-successive-pages area 515.

Defect position information E from the defect position discrimination unit 3 is written in the defect position area 511, and time information C1 form a calender timer 516 is written in the time area 512. Information C2 on the number of used roll pages which is obtained from print page count pulses CP and supplied by a printing page conuter 517 is written in the umber-of-used roll-pages area 513, and information C3 on roll paper name updating is read to the roll paper name area 514 at each roll paper replacement time. Information C4 on the number of pages through which defects are successively observed and monitored is read to the number-of-successive-pages area 515.

Time information C1, number-of-used-roll-pages information C2, and roll paper name updating information C3, each provides as record information, are written in the defect information register 51 by timings determined by a register writing signal P1 supplied from a first one-shot pulse generating circuit 519. The writing of number-of-successive-pages information C4 in the successive page area 515 is controlled on the basis of an output value from a flip flop 518 and an output value from an AND circuit 521 supplied with a later-described third timing signal T3. The content of the defect information register 51 is written in the defect file 53 by a defect file writing signal P2 supplied from a second one-shot pulse generation circuit 520.

A process of this embodiment will be described hereunder with reference to a timing chart shown in FIG. 5.

Figure 5:
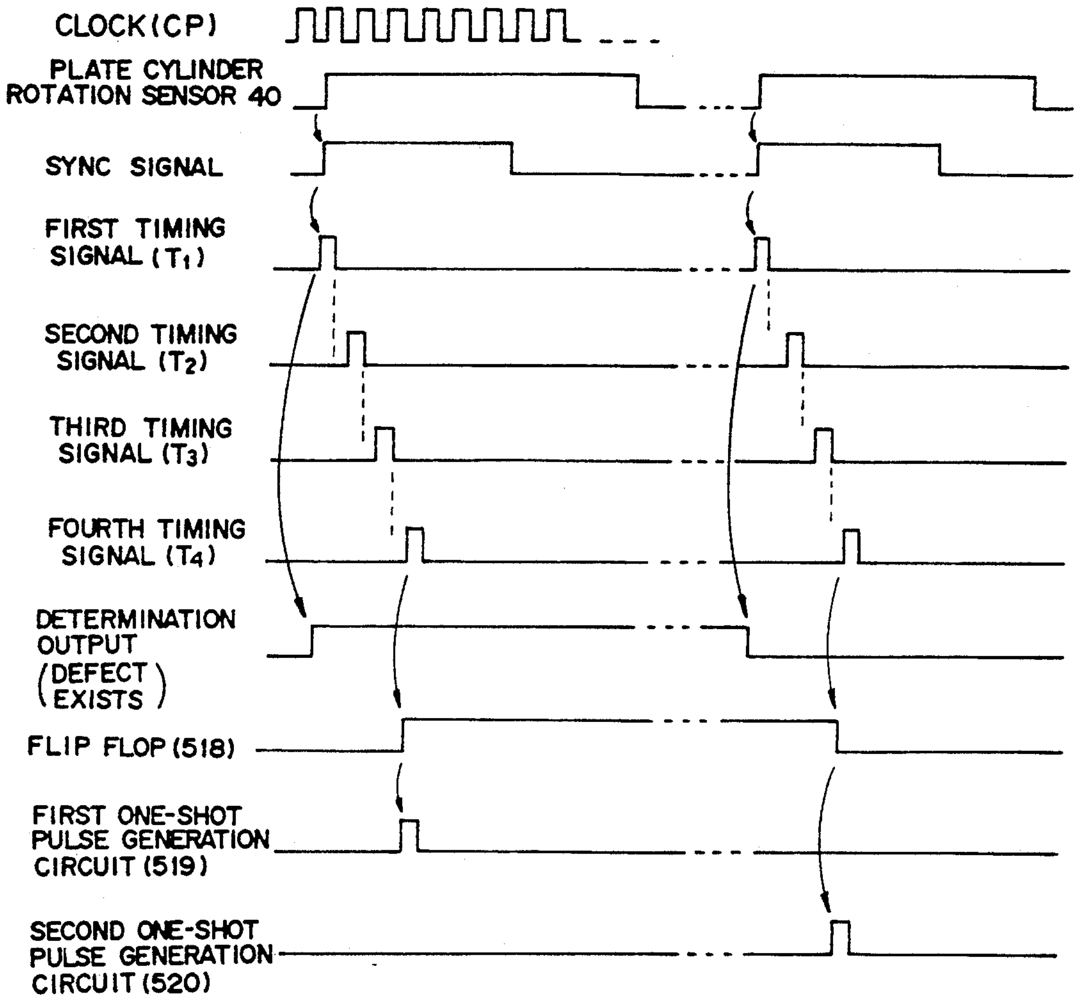
FIG. 5 is a timing chart of a control process.

For process timing, first, second, third and fourth timing signals T1, T2, T3, and T4 are generated by a synchronous signal based on a signal from a plate cylinder rotation sensor 40 as shown in FIG. 5. The rise of the signal from the plate cylinder rotation sensor 40 is synchronized with a plate cylinder gap start position. Inspection data Ai to be measured is sampled for a period of time from a rise of the first timing signal T1 to the next rise of the same, i.e., a period of time corresponding to one print page P.

Reference data Bi and inspection data Ai are compared by subtraction with respect to each pixel for the whole of one print page P in synchronization with this period of time of T1, and determination output Fi is obtained as the result of the subtraction comparison as mentioned above. That is, if the difference between inspection data Ai and reference data Bi is greater than the value of allowance data α ($Ai-Bi>\alpha$), it is determined that there is a defect, and determination output Fi is converted into a matrix information as defect position information E indicating the position of defective pixel Fi in the printed image. This operation is performed until the next second timing signal T2 is supplied. In the example shown in the timing chart of FIG. 5, the time interval between the first timing signal T1 and the second timing signal T2 corresponds to one pulse of clock CP. However, this period of time is selected as desired according to the time required for this operation.

This defect position information E is displayed in a matrix (xe, ye) as mentioned above. If the inspected pixel unit is constituted of $5\times1$ pixels, i.e., has a size of5 mm in the x-axis direction corresponding to the widthwise direction of the print web 2 and 1 mm in the y-axis direction corresponding to the direction of the web 2 flow, the defect occurrence position is, actually, ($5\times xe$, ye). However, the actual defect position may be displayed for this display. In such a case, the arrangement may be such that the with Δx and the length Δy of inspection-unit pixel Ii defined as shown in FIG. 1 are stored in a memory and are multiplied by the number of pixels i and the number of scanning lines observed before the defect position.

Defect position information E obtained in this manner is stored together with time information C1 in synchronization with the second timing signal T2.

Next, third timing signal T3 is input. At this time, however, the flip flop 518 is not set, the output from the AND circuit 521 is at a low level L, and the value of number-of-successive-pages information C4 is not counted and is still "0".

When fourth timing signal T4 is input, the flip flop 518 is set so that the output therefrom rises and register writing signal P1 is generated from the one-shot pulse generation circuit 519. In synchronization with this register writing signal P1, number-of-used-roll-pages information C2 and roll paper name information C3 are written in the defect information register 51. Defect position information E on all defective pixel of one print page is recorded in the defective position area 511.

Next, processing for discriminating defect position information Fi is performed with respect to the second print page.

If it is also determined with respect to the second print page that there is a defect, the output from the AND circuit 521 is set to a high level H in synchronization with third timing signal T3, and second page defect position information E is written in the defect position area 511 of the defect information register 51 and is logically combined with the first page defect position information E already written. Data of information E on the positions of defects detected through the first and second pages if thereby recorded in the defect position are 511 without omission.

The present value in the number-of-successive-pages area 515 is incremented by "1" by the output from the AND circuit 521 parallel to the operation of defect position information E. The number of successive page is thereby updated. It is set to "1" since it is "0" at the stage of first page information writing.

If it is determined with respect to the second print page that there is no defect, no defect position information E is supplied by the timing of third timing signal T3. Therefore, the information in the defect position area 511 is not changed by logical addition of it and the defect position information written in the defect information register 51. Only the present value in the number-of-successive-pages area is incremented by "1" to update the number of successive pages. It is updated to "1" since it is "0" at the time of first page information writing. In a case where defects are successively observed and monitored in the first and second pages but there is no defect in the third page, the number of successive pages is set to "2" by being updated at the time of the second and third pages.

When fourth time signal T4 is input, the flip flop 518 is inverted to reduce the output level, and defective file writing signal P2 is thereby generated from the second one-shot pulse generation circuit 520. Data in the defect information register 51 is written in the defect file 53 through the file management unit 52 by triggering with this defect file writing signal P2.

Figure 6:
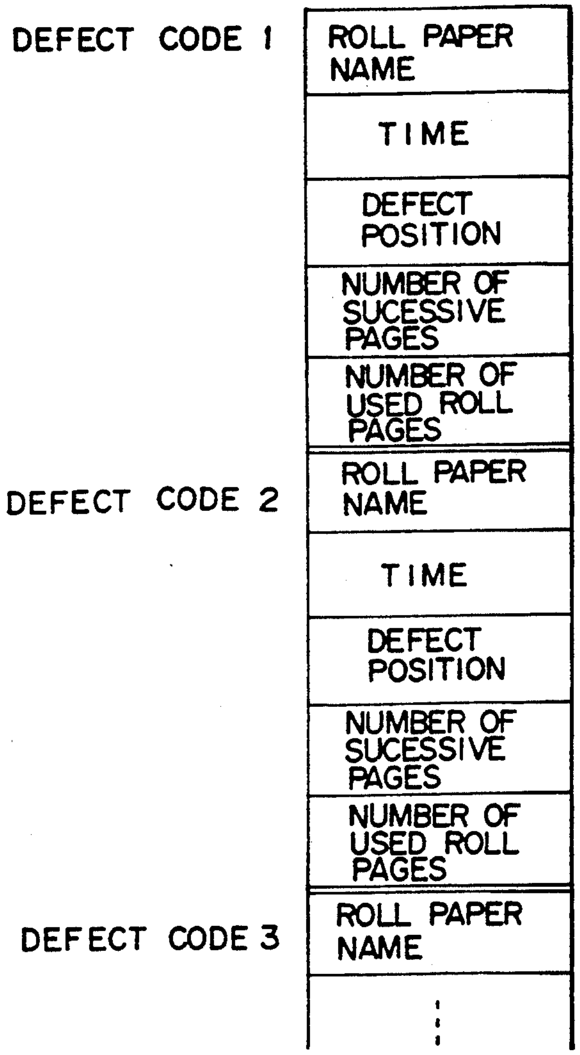
FIG. 6 is a diagram of the construction of a file for defects in a print.

Needless to say, the top address and other values for writing in the defective file 53 are separately controlled, and the data in the defect information register 51 is stored in a time series manner by setting each part of it in the period of time from the occurrence of a defect to the restoration to the normal state as one record, as shown in FIG. 6.

A printer control unit 54 always monitors the printed operation through a printer status signal, and sends a data request to the file management unit when print outputting is enabled. The file management unit 52 effects management of the process of outputting prints of the records in the defect file 53 as well as management of the defect file 53.

If there are some records not output yet when a data request is sent from the printer control unit 54, the data to be output by printing printed is transmitted to the printer control unit 54. The printer control unit 54 transmits the received print-output data to the printer 30, and teh printer 30 performs output processing.

Defect records thus obtained are output from the printer 30 one by one, and the operator can judge the kind of defect based on these recordings.

Examples of terms for method of determining the kind of defect are listed below.

(1) One-page defects (when the data on the number of successive pages is "1")

① wild formation of print paper

② a spatter of ink onto the print sheet between the final printing unit and the drier
③ a spatter of water onto the print sheet between the final printing unit and the drier
④ a drop of tar onto the print sheet, an accumulation of tar in the drier furnace
(2) Successive defects
① a spatter of ink onto a roller, a printing plate and the print sheet between the first printing unit and the final printing unit
② a spatter of water onto a roller, a printing plate and the print sheet between the first printing unit and the final printing unit
③ a change in density
④ a register failure
(3) Causes with respect to time (periodical)
① ink, dropping, i.e., surplus ink sticking to mechanical components
② water drops, i.e., dew condensation on mechanical components
(4) Roll paper name
① wild formation of print paper in connection with ① in the above item (1)
(5) Number of used roll pages (periodical)
① a change in density in connection with ③ in the above item (2)

It is thereby possible for the operator to easily suppose causes of defects from the records of the defects.

That is, the record at the time of the occurrence of a defect is displayed by the defect record memory unit and the record display unit, such as a printer, and the operator can thereby confirm a periodicity and other characteristic of the defect and can easily ascertain production hindrance causes, inclusive of those relating to the printing machine and the print sheet, thus improving the maintenance operation facility.

In the above-described embodiment, a defect record is displayed to enable discrimination of the kind of defect, and a modified construction of the present invention will be described hereunder.

Figure 7:
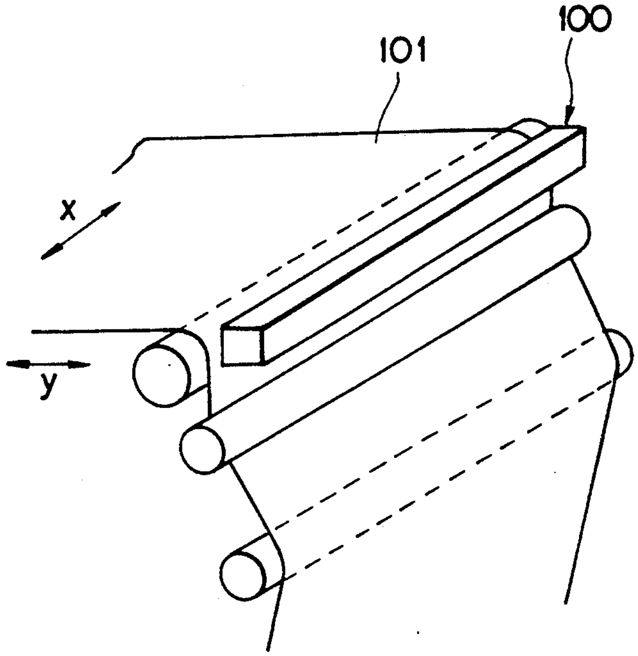
FIG. 7 is a schematic perspective view of a print monitoring apparatus in accordance with a modified construction of the present invention.
Figure 8:
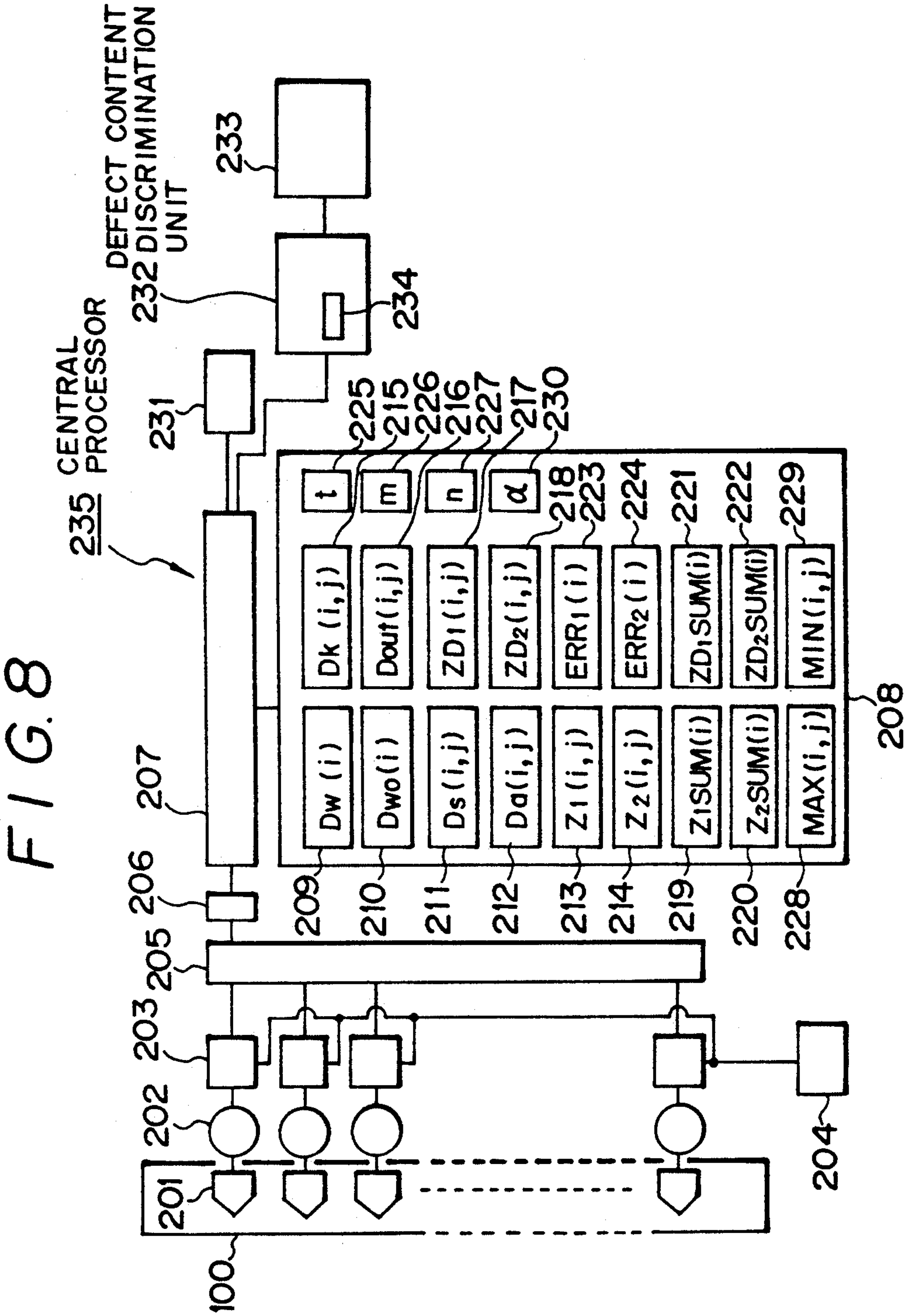
FIG. 8 is a schematic diagram of essential portions, i.e. central processor, of the apparatus shown in FIG. 7.

FIGS. 7 and 8 schematically show the construction of a printing monitoring apparatus in accordance with the modified construction of the present invention. A detection sensor 100 serves to observe or monitor contaminations or the like caused on a print surface 101. A contamination may accidentally be caused on the print surface 101 by ink spattering, water or oil dropping, or the like, and it is therefore necessary to observe the print surface. The detection sensor 100 extends in a direction (longitudinal direction x of the print surface) perpendicular to the direction in which the print surface travels (the direction of the print surface flow), and has a plurality of light receiving elements (or one element) 201 arranged at suitable intervals in the longitudinal direction x of the print surface.

The light receiving elements 201 detect reflected light from the print surface 101.

Photoelectric currents generated by the light receiving elements 201 are converted into voltages of reflection density information by current-voltage logarithmic conversion effected by logarithmic conversion units 202, which voltages are amplified to desired levels.

Figure 9:
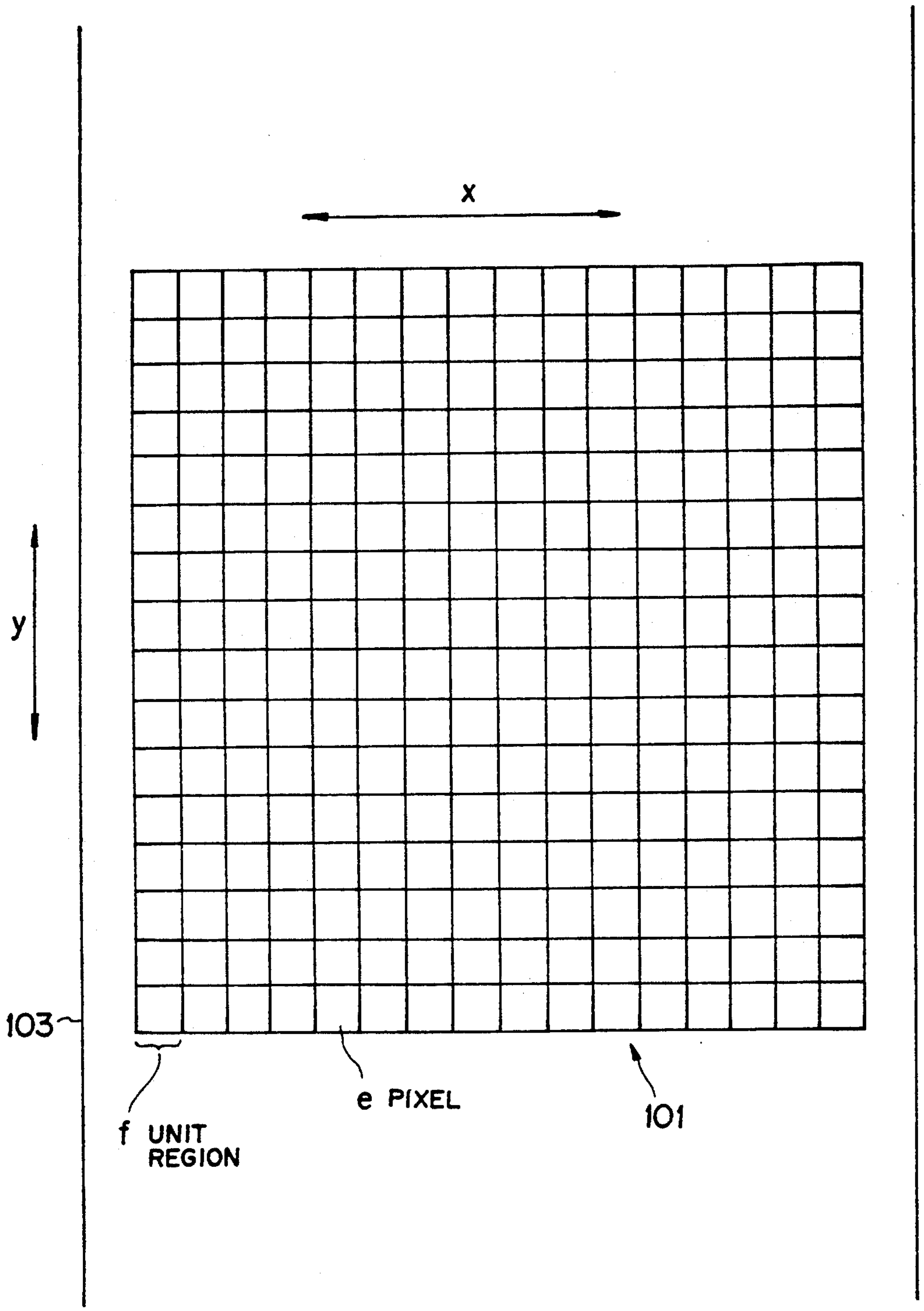
FIG. 9 is a diagram of a state in which a print surface to be observed or monitored is sectioned into pixels.

The reflection density information obtained with respect to pixels is sent to sample and hold amplifiers 203 which are supplied with a sample signal from an encoder unit 204. The sample signal is formed by the encoder unit 204 in accordance with the pixel size in the web flow direction x in correspondence with the movement of the print surface 101. By the plurality of light receiving elements and the sample and hold amplifiers 203, a frame of the print surface 101 is divided into fine pixels e, t pixels in the longitudinal direction x and m pixels in the flowing direction y, as shown in FIG. 9.

The reflection density information sampled and held in correspondence with the pixels by the sample and hold amplifiers 203 is time-shared by a multiplexer 205 to be successively sent to an A/D converter 206. A plurality of multiplexers 205 and A/D converters 206 may be used in a parallel processing manner to reduce the processing time.

The reflection density information with respect to the pixels is converted from analog values into digital values by the A/D converter 206.

The digital values of the converted reflection density information are stored in a memory unit 208 at predetermined memory positions with respect to the pixel positions under the control of memory controller 207.

The memory unit 208 is divided according to memory contents into the following sections:

a memory 209 (white sheet surface matrix section Dw (i)), a memory 210 (white surface allowance value matrix section Dwa (i)), a memory 211 (reference value matrix section Ds (i, j)), a memory section 212 (allowance value matrix section da (i, j)), a memory 213 (image determination matrix section Z1 (i, j)), a memory 214 (image determination matrix section Z2 (i, j)), a memory 215 (measured value matrix section Dk (i, j)), a memory 216 (determination result matrix section Dout (i, j)), a memory 217 (product matrix section ZD1 (i, j)), a memory 218 (product matrix section ZD2 (i, j)), a memory 219 (added matrix section Z1 SUM (i)), a memory 220 (added matrix section Z2 SUM (i)), a memory 221 (added matrix section ZD1 SUM (i)), a memory 222 (added matrix section ZD2 SUM (i)), a memory 223 (percent defective matrix section ERR1 (i)), a memory 224 (percent defective matrix section ERR2 (i)), a memory 225 (number-of-light-receiving-elements memory 201), a memory 226 (print surface flow direction resolution value memory m), a memory 227 (predetermined number-of-pages memory n), a memory 228 (maximum matrix section MAX (i, j)), and a memory 230 (coefficient memory $\alpha$).

An operation unit 231 effects operations (addition, substraction, multiplication, division, comparison) designated for memory contents extracted through the memory controller 207.

The operation unit 231, the memory controller 207 and the memory unit 208 described above constitute a central processor 235.

A defect content discrimination unit 232 discriminates the content of a defect based on based on values in the percent defective matrix sections ERR1 (i), i.e., memories 223 and 224 in the memory unit 208 obtained by operation processing of the operating unit 203 and a percent defective discrimination value 234 stored in the percent defective discrimination section 232, and generates a discrimination signal.

The discrimination signal is sent to a printing control unit 233. The printing control unit 233 performs operations of displaying to the operator, stopping the printing machine, instructing a printing machine adjustment unit, and the like.

The percent defective discrimination value 234 can be rewritten from the printing control unit.

Figure 10:
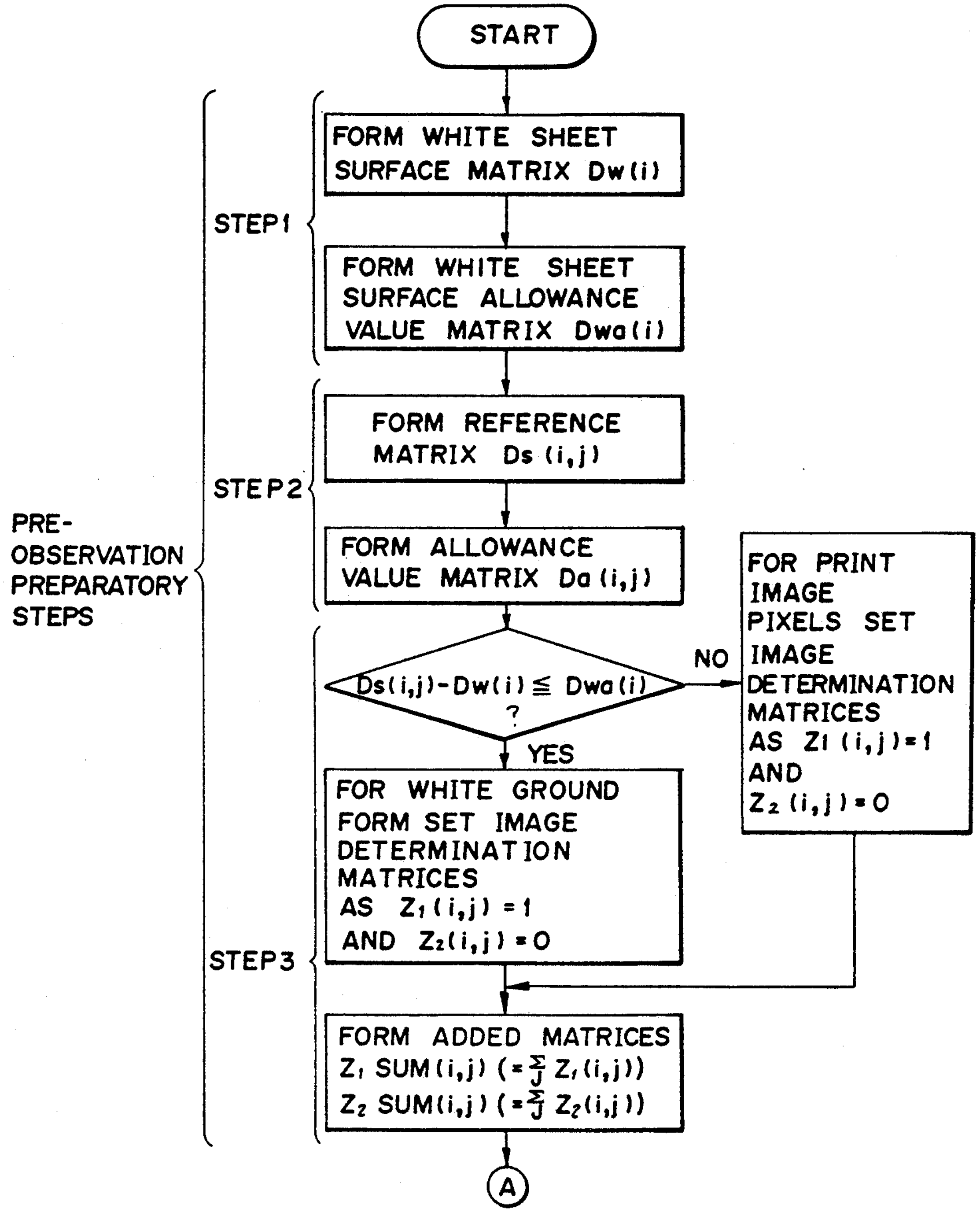
FIG. 10, 11 and 12 are flowcharts of a procedure for determining the contents of defects in a print surface in the apparatus shown in FIG. 7.
Figure 11:
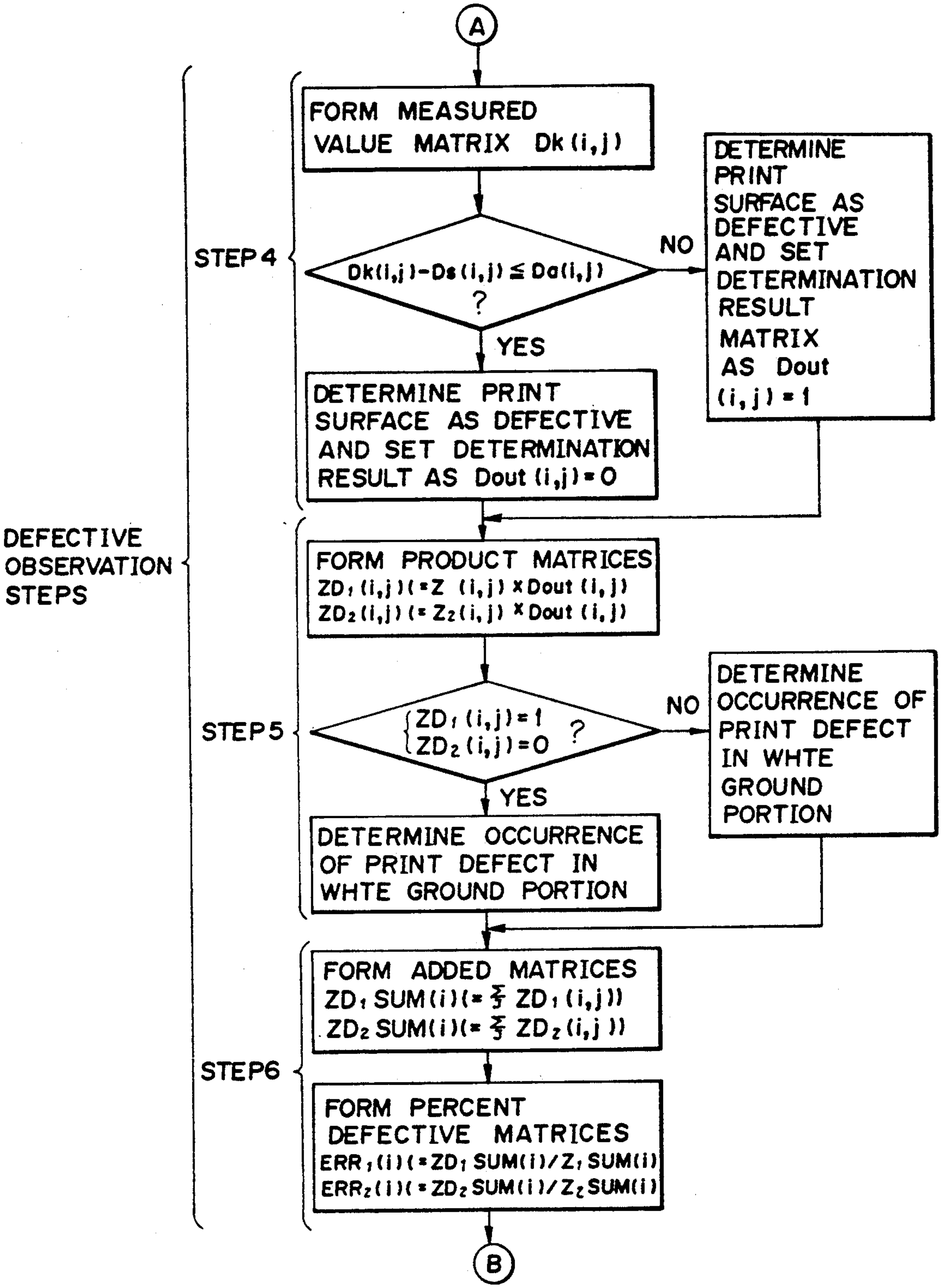
Figure 12:
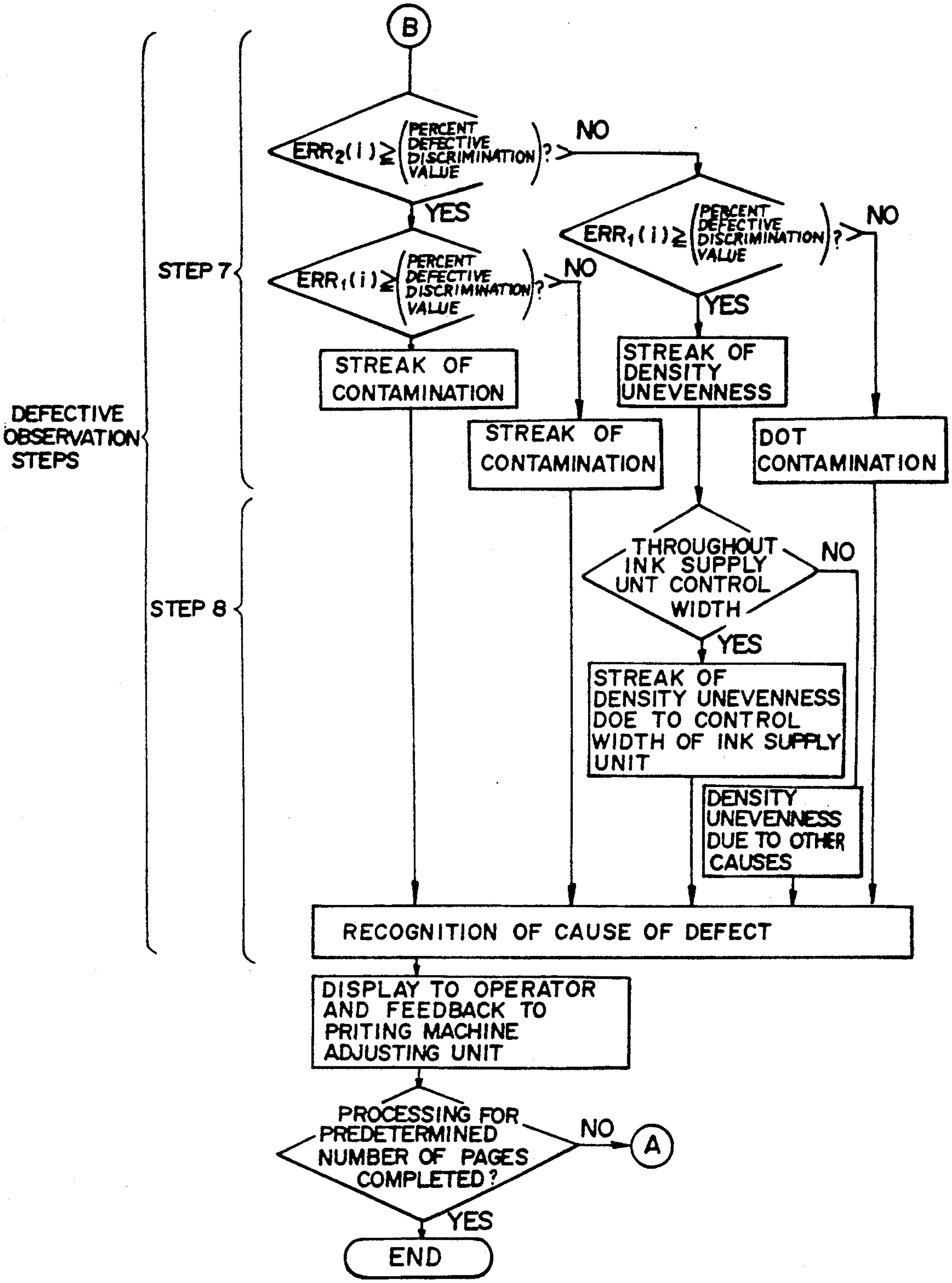

A procedure for determining the content of a defect in the print surface 101 will be described hereunder with reference to FIGS. 10 to 12.

Pre-Monitoring Preparatory Step

Step 1

A desired number of white sheet pages (white ground) are prepared (which number is determined according to the capability of the print monitoring apparatus and the changing state of the printing machine).

Reflection density information on the pixels of a first pge, i.e., reflection density values are stored in the memory 215 at predetermined positions and are simultaneously stored in the memories 228 and 229. Each of the values of information on the second page and subsequent pages is additionally stored in the memory 215, is compared with the value preliminarily stored in the memory 228 to be stored by replacing the preceding value in the memory 228 if it is larger than the preceding value, and is compared with the value preliminarily stored in the memory 229 to be stored by replacing the preceding value if it is smaller than the preceding value. This operation is repeated with respect to the predetermined number of pages (n pages) stored in the memory 227 (predetermined-number-of-pages memory). After the completion of processing of the predetermined number of pages, the contents of the memory 215 are divided by the value n in the memory 227 to obtain mean values of the pixels which are stored in the memory 215. Of these contents of the memory 215, all the values for the flow direction pixels at each longitudinal direction pixel position are added, and values thereby obtained are divided by the value in the memory 226 and are store in the memory 209.

A white sheet surface matrix Dw (i) is thereby formed in the memory 209.

The reason for forming the white sheet surface matrix by combining the data in the flow direction into Dw (i) is because a considerable dispersion of the reflection density due to light source non-uniformity, receiving light source non-uniformity, light receiving element non-uniformity and the like of the monitoring apparatus is exhibited in the longitudinal direction while no substantially large dispersion occurs in the flow direction.

For the same reason, some other matrices are combined with respect to the longitudinal direction pixels. Each group of flow direction pixel e combined with respect to the longitudinal direction pixels constitutes a unit region f.

Next, of the contents of the memory 228, all the values for the flow direction pixels at each longitudinal direction pixel position are added, and values thereby obtained are divided by the value in the memory 226 and are stored in the memory 210. Then, of the contents of the memory 229, all the values of the flow direction pixels at each longitudinal direction pixel position are added, values thereby obtained are divided by the value in the memory 226, and the contents of the memory 210 are rewritten by subtracting the divided values from the receding values in the memory 210. The contents of the memory 210 are further rewritten by multiplying the value in the memory 210 for each pixel by the value $\alpha$ in the memory 230 (coefficient memory).

A white sheet surface allowance value matrix Dwa (i) is formed in the memory 210 in this manner.

Step 2

When the printing operator recognizes that goods prints have been obtained after printing adjustment operations, reference data is preferred by using such prints as reference print pages. Reflection density values of the pixels of the first reference print page are stored in the memory 211 at the predetermined positions and are simultaneously stored in the memories 228 and 229 at predetermined positions. Each of the value of information on the second reference print page and subsequent pages is additionally stored in the memory 211, is compared with the value previously stored in the memory 228 to be stored by replacing the preceding value in the memory 228 if it is larger than the preceding value, and is compared with the value previously stored in the memory 229 to be stored by replacing the preceding value if it is smaller than the preceding value. This operation is repeated with respect to the predetermined number of pages (n pages) stored in the memory 227. After the completion of processing of the predetermined number of pages, the contents of the memory 211 are divided by the value n in the memory 227 to obtain mean values of the pixels which are stored in the memory 211 by replacing the preceding values. In this manner, a reference value matrix Ds (i, j) is formed in the memory 211.

Next, the contents of the memory 229 are subtracted from those of the memory 228 and the resulting values are stored in the memory 212. The contents of the memory 212 are rewritten by multiplying the values thereof by the value $\alpha$ of the memory 30 (coefficient memory).

An allowance value matrix Da (i, j) is thereby formed in the memory 212.

Step 3

The difference between the reference value matrix Ds (i, j) and the white sheet surface matrix Dw (i) is obtained with respect to all the flow direction pixels at each longitudinal direction pixel position. If the absolute value of this difference is smaller than the value of the white sheet surface allowance value matrix Dwa (i), the corresponding pixel is determined as a white ground portion (non-image portion). In this case, "0" is set in the corresponding position Z1 (i, j) in the memory 213, while "1" is set in the corresponding position Z2 (i, j) in the memory 214. If the absolute value of the difference is greater than the value of the white sheet surface allowance value matrix Dwa (i), corresponding pixel is determined as an image portion. In this case, "1" is set in the corresponding position Z1 (i, j) in the memory 213, while "0" is set in the corresponding position Z2 (i, j) in the memory 214. In this manner, an image determination matrix Z1 (i, j) having image information is formed in the memory, while an image determination matrix Z2 (i, j) having white ground information is formed in the memory 214.

Next, all the values of the image determination matrix Z1 (i, j) for the flow direction pixels at each longitudinal direction pixel position are added and the added values are stored in the memory 219. Also, all the values in the memory 214 for the flow direction pixels at each longitudinal direction pixel position are added and the added values are stored in the memory 220.

In this manner, an added matrix Z1 SUM (i) is formed in the memory 219 and an added matrix Z2 SUM (i) is formed in the memory 220.

The pre-monitoring preparatory operation is thus completed.

In the above description, it is assumed that the value n in the predetermined-number-of-pages memory, i.e., memory 227 and the value $\alpha$ in the coefficient memory 230 are always equal. However, these may have difference between the case of the white sheet surfaces and the case of the reference surface.

Defective Monitoring Step

Next, the following processing is performed with respect to the print surface to be observed or monitored to determine defectives.

Step 4

Reflection density values of the pixels of the print surface 101 are stored in the memory 215 at the predetermined positions to form a measured value matrix Dk (i, j) in the memory 215 (where k represents the k-th print page). The measured value matrix Dk (i, j) and the reference value matrix Ds (i, j) are compared with each other. If a difference therebetween is greater than corresponding value of the allowance values matrix Da (i, j), it is determined that the corresponding print page is defective, and "1" is set as a content of the memory 216. In the other case, "0" is set in the memory 216.

A determination result matrix Dout (i, j) is thereby formed in the memory 216.

Step 5

The values of the image determination matrix Z1 (i, j) and the determination result matrix Dout (i, j) with respect to the pixels are multiplied and the result of this multiplication is stored in the memory 217. Also, the values of the image determination matrix Z2 (i, j) and the determination result matrix Dout (i, j) with respect to the pixels are multiplied and the result of this multiplication is stored in the memory 218.

A product matrix ZD1 (i, j) indicating the position of a defective pixel observed or monitored in the image portion of the print surface is formed in the memory 217. Similarly, a product matrix ZD2 (i, j) indicating the position of a defective pixel monitored in the white ground portion, i.e., the non-image portion of the print surface is formed in the memory 218.

Step 6

All the values of the product matrix ZD1 (i, j) for the flow direction pixels at each longitudinal direction pixel position are added and the added values are stored in the memory 221. Also, all the values of the product matrix ZD2 (i, j) for the flow direction pixels at each longitudinal direction pixel position are added and the added values are stored in the memory 222.

An added matrix ZD1 SUM (i) thereby formed in the memory 221, and an added matrix ZD2 SUM (i) is thereby formed in the memory 222.

Next, the contents of the added matrix ZD1 SUM (i) are divided by the corresponding values of the product matrix ZD1 (i, j), and the divided values are stored in the memory 223 at the positions corresponding to the pixels. Also, the contents of the added matrix ZD2 SUM (i) are divided by the corresponding values are stored in the memory 224 at the positions corresponding to the pixels.

A percent defective matrix ERR1 (i) for the image portion of the print surface is thereby formed in the memory 223, and a percent defective matrix ERR2 (i) for the white ground portion of the print surface is thereby formed in the memory 224.

Step 7

There are four possible cases of the relationship between the values of the percent defective matrices ERR1 (i) and ERR2 (i) and the percent defective distinction value 234 determined by the defect content discrimination unit 232 with respect to the longitudinal direction pixels according to the values of the percent defective matrices ERR1 (i) and ERR2 (i)

① a case where ERR1 (i) is greater and ERR2 (i) is also greater;

② a case where ERR1 (i) is greater while ERR2 (i) is smaller;

③ a case where ERR1 (i) is smaller while ERR2 (i) is greater; and

④ a case where ERR1 (i) is smaller and ERR2 (i) is also smaller.

In the case ①, it is indicated that many defects have occurred on the white ground portion of the print surface and other defects have occurred on the image portion. It is therefore considered that a streak of a contamination having a density higher than that of the image portion has occurred on the print surface.

In the case ③, it is indicated that many defects have occurred on the white ground portion of the print surface is recognized while defects in the image portion are not so many. It is therefore considered that a streak of a contamination having a density lower than that of the image portion has occurred on the print surface.

Thus, in the case ① or ③, it is determined that the streak of a contamination has occurred on the print surface.

In the case ②, it is indicated that many defects have occurred on the image portion of the print surface while defects in the white ground portion are not so many. It is therefore considered that an image formation failure has occurred. That is, a streak of an image portion having a density different from that of the reference image exists in the formed image. In the case ②, therefore, it is determined that a streak-like density unevenness has occurred in the image portion of the print surface.

In the case ④, defects in each of the image portion and the white ground portion of the print surface are not so many, and it is therefore determined that dots of a contamination are formed on the print surface.

Step 8

If the defect content is streak-like density unevenness as determined in the case ②, the following processing is further performed by the defect content discrimination unit 232.

If the control width of an ink supply unit of the printing machine is, for example, 30 mm, and if the longitudinal direction pixel width of the observation apparatus is, for example, 5 mm, $30 \div 5 = 6$ pixels constitute an image portion within the control width of the ink supply unit. In this case, if the detect content determination result is ②, and if the same result is obtained with respect to, for example, six pixels successive in the longitudinal direction, this defect is determined as streak-like density unevenness due to the control width of the ink supply unit.

The above-described steps (Steps 1 to 8) are executed to know the content of a defect in the print surface as well as to confirm the occurrence of the defect.

The defective observation steps (Steps 4 to 8) are repeated with respect to each print surface of the second and subsequent pages, and data thereby obtained is used in a feedback manner for automatic adjustment of the printing machine adjusting unit, automatic stop and so on to prevent occurrence of many defects and to contribute to the improvement in the availability factor of the printing machine.

This modification has been described with respect to an example of a process in which even if the print image is a monochromic or four-color print, the image is not recognized as colors but simply as changes in density. However, needless to say, the arrangement may be such that color separation processing is performed in a sensor unit and the same method as that described above is used for processing of each color so that more detailed printing error information can be obtained.

As described above, the percent defectives and the percent defective discrimination value are compared to separate kinds of print defect into transitory defects, such as a spatter of ink, and a drop of water or oil dropping, and continuous defects, such as streak-like density unevenness and streak-like contaminations.

In the case of a continuous defect, an operation for instructing the operator to adjust the printing machine, effecting automatic adjustment or stopping the printing machine is performed to prevent occurrence of many defects, thereby contributing to the improvement in the availability factor of the printing machine.

What is claimed is:

1. A print monitoring apparatus for monitoring a print transport out of a printing unit, comprising:

- a defect position discrimination means for discriminating a position of a defect on a print web of the print fed from the printing unit;
- a defect memory means for storing defect position information given from the defect position discrimination means and record information containing defect occurrence time, a number of successive occurrence pages, a roll paper name and a number of used pages; and
- a display means for displaying the information stored in the defect memory means.

2. A print monitoring apparatus according to claim 1, wherein said defect position discrimination means comprises a monitoring sensor for dividing a print surface of the print web into a plurality of pixels and converting information of pixels into electric signals, a reference data memory for storing reference data preliminarily prepared for each print, an inspection data memory for storing actual inspection data, a subtractor for carrying out substraction between the reference data and the inspection data, an allowance data memory for storing allowance data, a comparator for comparing inspection output data from the subtractor and the allowance data, and a position information converter for converting defect information discriminated by the comparator into information on the position of the print web.

3. A print monitoring apparatus according to claim 2, wherein a changeover switch is provided between the reference data memory and the inspection data memory for selectively transmitting the data obtained by the monitoring sensor to the reference data memory or the inspection data memory.

4. A print monitoring apparatus according to claim 2, wherein said subtractor carries out subtraction with respect to each pixel and outputs substraction result as the inspection output data.

5. A print monitoring apparatus according to claim 2, wherein said monitoring sensor is composed of a line sensor including a plurality of light receiving elements in an arrangement corresponding to the pixels, respectively.

6. A print monitoring apparatus according to claim 1, wherein said defect memory means is composed of a defect information register, a file management means and a defect file means, said defect information register including a defect position area, a time area, a number-of-used-roll-pages area, a roll paper name area, and a number-of-successive-pages area.

7. A print monitoring apparatus for monitoring a print transport out of a printing unit, comprising:

- a print defect detection means for detecting defect on a print web of the print fed from the printing unit, said defect detection means including a monitoring sensor for dividing a print surface of the print web into a plurality of pixels and converting information of pixels into electric signals representing density information of the respective pixels;
- a central processing unit for processing information data regarding the density information of the respective pixels from the print defect detection means; and
- a defect content discrimination means for discriminating defect content in accordance with information data from the central processing unit and preliminarily set reference for the discrimination.

8. A print monitoring apparatus according to claim 7, wherein said monitoring sensor is composed of a line sensor including a plurality of light receiving elements detecting reflection lights from the print web as reflection density information.

9. A print monitoring apparatus according to claim 8, wherein said central processing unit includes means for calculating a percent defective of a non-image portion of the print web and a percent defective of an image portion thereof based on the reflection density information with respect to the pixels of the print web and wherein said defect content discrimination means includes means for determining the content of the defect by comparing the percent defective of the non-image portion obtained by the central processing unit with the percent defective discrimination value preliminarily set.

10. A print monitoring apparatus according to claim 7, further comprising a memory controller operatively connected to the print defect detection means into which density information from the print defect detection means is inputted and wherein said central processing unit includes memory means operatively connected to the memory controller and including a plurality of memory elements into which density information of the pixels are stored in correspondence with the respective pixels and includes operation means for carrying out operation in accordance with density information stored in memory means under a control of the memory controller.

* * * * *